US012735626B2

(12) United States Patent
Nguyen et al.

(10) Patent No.: US 12,735,626 B2
(45) Date of Patent: Sep. 15, 2026

(54) SURFACE-MODIFIED NANOPARTICLE COMPOSITIONS AND RELATED APPLICATIONS IN SUBTERRANEAN HYDROCARBON RECOVERY

(71) Applicant: ChampionX LLC, Sugar Land, TX (US)

(72) Inventors: Duy T. Nguyen, Richmond, TX (US); William T. Duttlinger, Jr., Houston, TX (US); Rangarani Karnati, Naperville, IL (US); Zhengang Zong, Aurora, IL (US); Kai He, Sugar Land, TX (US); Linh Do, Sugar Land, TX (US)

( * ) Notice: Subject to any disclaimer, the term of this patent is extended or adjusted under 35 U.S.C. 154(b) by 0 days.

(21) Appl. No.: 18/644,423

(22) Filed: Apr. 24, 2024

(65) Prior Publication Data

US 2024/0271030 A1 Aug. 15, 2024

Related U.S. Application Data

(63) Continuation of application No. 17/785,643, filed as application No. PCT/US2020/032848 on May 14, 2020, now Pat. No. 11,999,900.

(60) Provisional application No. 62/948,619, filed on Dec. 16, 2019.

(51) Int. Cl.
*E21B 43/16* (2006.01)
*C09K 8/584* (2006.01)

(52) U.S. Cl.
CPC .............. *C09K 8/584* (2013.01); *E21B 43/16* (2013.01); *C09K 2208/10* (2013.01)

(58) Field of Classification Search
CPC ...... C09K 8/584; C09K 2208/10; E21B 43/16
See application file for complete search history.

(56) References Cited

U.S. PATENT DOCUMENTS

| | | | | |
|---|---|---|---|---|
| 4,296,812 | A | 10/1981 | Kalfoglou | |
| 6,632,527 | B1 * | 10/2003 | McDaniel | C09K 8/805 428/404 |
| 8,058,213 | B2 * | 11/2011 | Rediger | C09K 8/805 507/924 |
| 9,562,188 | B2 | 2/2017 | Monroe et al. | |
| 9,605,789 | B2 | 3/2017 | Wray et al. | |
| 9,701,888 | B2 | 7/2017 | Nguyen | |
| 9,725,640 | B2 | 8/2017 | Tang et al. | |
| 9,862,881 | B2 | 1/2018 | Drake et al. | |
| 10,377,942 | B2 | 8/2019 | Southwell et al. | |
| 2004/0180795 | A1 | 9/2004 | Su et al. | |
| 2007/0202318 | A1 * | 8/2007 | Smith | C09K 8/805 428/323 |
| 2010/0096139 | A1 | 4/2010 | Holcomb et al. | |
| 2012/0015852 | A1 | 1/2012 | Quintero et al. | |
| 2012/0152548 | A1 * | 6/2012 | Hinkel | G01N 24/081 166/305.1 |
| 2012/0168165 | A1 | 7/2012 | Holcomb et al. | |
| 2012/0175120 | A1 | 7/2012 | Holcomb et al. | |
| 2012/0285690 | A1 | 11/2012 | Weaver et al. | |
| 2014/0332212 | A1 | 11/2014 | Ayers et al. | |
| 2016/0083639 | A1 | 3/2016 | Xu et al. | |
| 2016/0362594 | A1 * | 12/2016 | Rojas | C09K 8/487 |
| 2017/0096597 | A1 | 4/2017 | Hu et al. | |
| 2018/0112122 | A1 | 4/2018 | Phan et al. | |
| 2018/0134949 | A1 | 5/2018 | Monastiriotis et al. | |
| 2018/0265766 | A1 | 9/2018 | Peng et al. | |
| 2018/0282615 | A1 | 10/2018 | Khamatnurova et al. | |
| 2018/0291253 | A1 | 10/2018 | Salla et al. | |
| 2018/0327652 | A1 | 11/2018 | Kuznetsov et al. | |
| 2018/0362834 | A1 | 12/2018 | Haghighi et al. | |
| 2019/0010382 | A1 | 1/2019 | Kuznetsov et al. | |
| 2019/0055825 | A1 | 2/2019 | Babcock et al. | |
| 2019/0078016 | A1 | 3/2019 | Southwell et al. | |
| 2019/0169492 | A1 * | 6/2019 | Hill | C09K 8/602 |
| 2023/0037819 | A1 | 2/2023 | Nguyen et al. | |

FOREIGN PATENT DOCUMENTS

| | | |
|---|---|---|
| CN | 103214631 | 7/2015 |
| KR | 101872020 | 6/2018 |
| WO | 2017136641 | 8/2017 |
| WO | 20180187563 | 10/2018 |
| WO | 2019013799 | 1/2019 |
| WO | 2019045715 | 3/2019 |
| WO | 2019053907 | 3/2019 |

OTHER PUBLICATIONS

International Search Report for International Application No. PCT/US2020/032848, mailed on Sep. 1, 2020, 5 pages.

Written Opinion for International Application No. PCT/US2020/032848, mailed on Sep. 1, 2020, 7 pages.

Dai et al., Spontaneous Imbibition Investigation of Self-Dispersing Silica Nanofluids for Enhanced Oil Recovery in Low-Permeability Cores, Energy Fuels, vol. 31, pp. 2663-2668 (2017).

Cao et al., Application of Amino-Functionalized Nanosilica in Improving the Thermal Stability of Acrylamide-Based Polymer for Enhanced Oil Recovery, Energy Fuels, vol. 32, pp. 246-254 (2018).

Li et al., Investigation of Spontaneous Imbibition by Using a Surfactant-Free Active Silica Water-Based Nanofluid for Enhanced Oil Recovery, Energy Fuels, vol. 32, pp. 287-293 (2018).

Cheraghian et al., Silica Nanoparticle Enhancement in the Efficiency of Surfactant Flooding of Heavy Oil in a Glass Micromodel, Ind. Eng. Chem. Res. Vo. 56, pp. 8528-8534 (2017).

Zallaghi et al., Improving the microscopic sweep efficiency of water flooding using silica nanoparticles, J Petrol Explor Prod Technol, vol. 8, pp. 259-269 (2018).

McElfresh et al., Stabilizing Nano Particle Dispersions in High Salinity High Temperature Downhole Environments, Society of Petroleum Engineers, SPE 154758, 6 pages (2012).

(Continued)

*Primary Examiner* — Silvana C Runyan

(74) *Attorney, Agent, or Firm* — Keith C. Rawlins, Esq.; Scheef & Stone, L.L.C.

(57) ABSTRACT

Surface-modified nanoparticles and surfactants are used in compositions and methods for enhancing hydrocarbon recovery from subterranean formations.

22 Claims, 1 Drawing Sheet

(56) References Cited

OTHER PUBLICATIONS

Ogolo et al., Enhanced Oil Recovery Using Nanoparticles, Society of Petroleum Engineers, SPE 160847, 9 pages (2012).
Alomair et al., Nanofluids Application for Heavy Oil Recovery, Society of Petroleum Engineers, SPE-171539-MS, 18 pages (2014).
Ko et al., Efficient Removal of EOR Polymer from Produced Water Using Magnetic Nanoparticles and Regeneration/Re-Use of Spent Particles, Society of Petroleum Engineers, SPE-179576-MS, 13 pages (2016).
Yuyang et al., Study on Enhanced Oil Recovery of Water-Based Nanofluid with Functional Silica Nanoparticles, Society of Petroleum Engineers, SPE-186328-MS, 8 pages (2017).
Alvarez-Berrios et al., Effect of the surface charge of silica nanoparticles on oil recovery: wettability alteration of sandstone cores and imbibition experiments, International Nano Letters, vol. 8, pp. 181-188 (2018).
Behzadi et al., Environmentally responsive surface-modified silica nanoparticles for enhanced oil recovery, Journal of Nanoparticle Research, vol. 18, No. 266, 19 pages (2016).

* cited by examiner

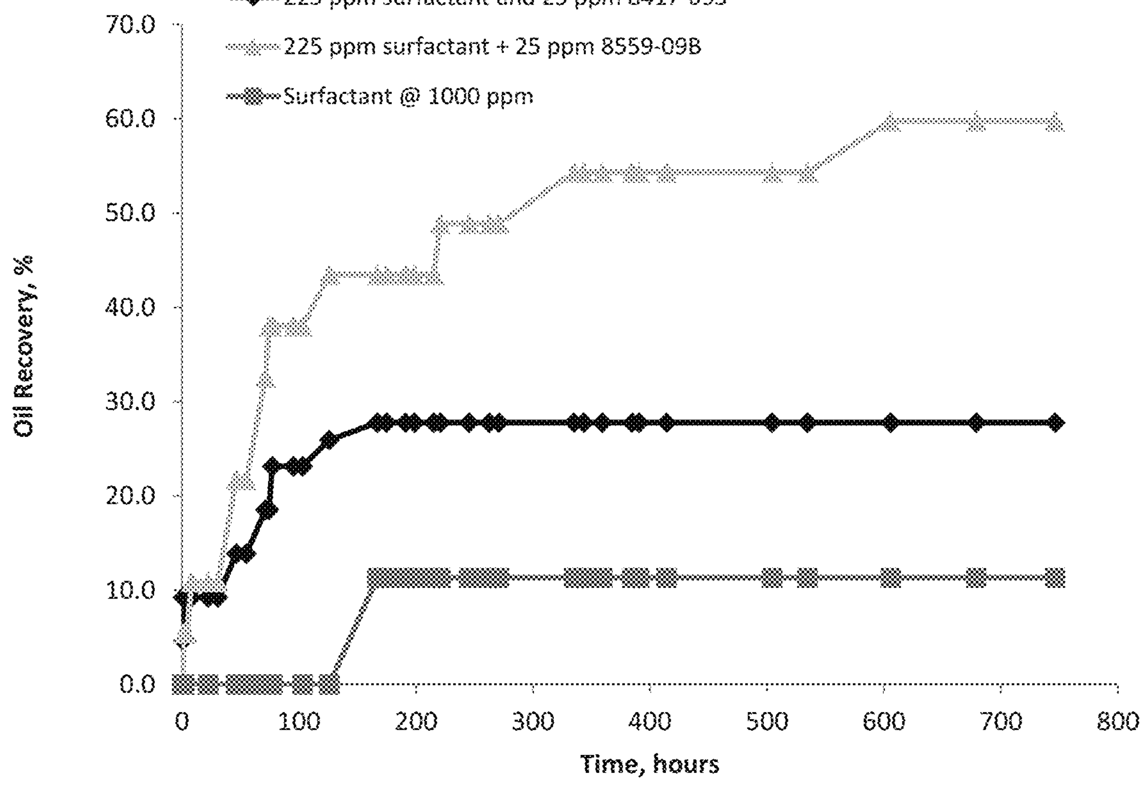
225 ppm surfactant and 25 ppm 8417-093
225 ppm surfactant + 25 ppm 8559-09B
Surfactant @ 1000 ppm
70.0
60.0
50.0
40.0
30.0
20.0
10.0
0.0
Oil Recovery, %
0
100
200
300
400
500
600
700
800
Time, hours

SURFACE-MODIFIED NANOPARTICLE COMPOSITIONS AND RELATED APPLICATIONS IN SUBTERRANEAN HYDROCARBON RECOVERY

CROSS REFERENCE TO RELATED APPLICATIONS

This application is a continuation of U.S. patent application Ser. No. 17/785,643, filed on Jun. 15, 2022, entitled "Surface-Modified Nanoparticle Compositions and Related Applications in Subterranean Hydrocarbon Recovery," issued as U.S. Pat. No. 11,999,900, which is a 371 application of International Patent Application No. PCT/US2020/032848, filed on May 14, 2020, entitled "Surface-Modified Nanoparticle Compositions and Related Applications in Subterranean Hydrocarbon Recovery," published as International Application Publication No. WO 2021/126303 A1. which claims the benefit of and priority to U.S. Provisional Patent Application Ser. No. 62/948,619, filed Dec. 16, 2019, each of the disclosures being incorporated by reference herein in its entirety.

FIELD

The application is directed to compositions and methods to improve hydrocarbon recovery in subterranean formations.

BACKGROUND

Chemical additives are used throughout the petroleum industry for increasing the rate or total amount of hydrocarbon compounds recovered from hydrocarbon-bearing subterranean formations. Conventionally, chemical additives including one or more surfactants (and optionally other materials such as polymers) are combined with a fluid, usually a water source, and this combination is injected underground. Such combinations may be referred to as "injectates." The injected surfactants lower the interfacial tension between the fluid and/or connate (subterranean water source) and the hydrocarbon (oil); and may further change the wettability of the subterranean formation rock, thereby increasing the yield of hydrocarbon compounds released and/or the rate of their recovery.

Injectates are also used in "enhanced hydrocarbon recovery." This recovery refers to processes carried out on already established wells for increasing the rate or total amount of hydrocarbon collected, mainly to "reinvigorate" a well (referred to in the art as secondary oil recovery) and/or when collection has substantially stopped (referred to in the art as tertiary oil recovery).

Unfortunately, the surfactants and mixtures thereof for enhancing oil recovery are unstable when combined with saline water sources or water sources with high total dissolved solids. For example, one or more surfactants may precipitate out or otherwise be rendered less dispersed in an aqueous solution when mixed with seawater and/or other high total dissolved solids-containing water sources, thereby rendering the surfactants less effective for enhancing oil recovery.

The surfactants and mixtures thereof can also be unstable or insoluble at high temperatures. For example, in some subterranean formations temperatures can exceed 60° C. and can get as high as 250° C.

In addition to the foregoing problems, some wells characterized as having "tight" or "very tight" subterranean rock formation can pose a problem in recovering hydrocarbons.

As petroleum supplies from conventional oilfield rocks dwindle or are depleted, compositions and methods that are effective for tight subterranean rock formations and enhanced hydrocarbon recovery of subterranean formations are needed.

SUMMARY

Described herein are compositions and methods for treating a subterranean formation to enhance hydrocarbon recovery.

In one aspect, a method of treating a subterranean formation comprises introducing a treatment fluid composition into a subterranean formation or well, wherein the treating fluid composition comprises a surface-modified nanoparticle, a stability component, and a surfactant composition, the surfactant composition comprising amphoteric surfactants and nonionic surfactants or a mixtures thereof, and a solvent selected from a water source, coupling agent or mixture thereof. In some aspects, the surfactant composition can further include anionic surfactants with the amphoteric surfactants and nonionic surfactants or mixtures thereof.

In another aspect, a method of altering the water wettability of a surface in a subterranean formation or well, the method comprises the step of introducing a treatment fluid into the subterranean formation or well to contact a solid surface of the subterranean formation or well, wherein the contact angle of water on the surface is altered at least 10° and wherein the treatment fluid comprises a surface-modified nanoparticle, a stability component, and a surfactant composition, the surfactant composition comprising amphoteric surfactants and nonionic surfactants or a mixtures thereof, and a solvent selected from a water source, coupling agent or mixture thereof. In some aspects of the method of altering the water wettability of a surface in a subterranean formation or well, the surfactant composition can further include anionic surfactants with the amphoteric surfactant and nonionic surfactants or mixtures thereof.

In yet another aspect, a composition for improving hydrocarbon recovery from a subterranean formation comprising a surface-modified nanoparticle, a stability component, and a surfactant composition, the surfactant composition comprising amphoteric surfactants and nonionic surfactants or mixtures thereof, and a solvent selected from a water source, coupling agent or mixture thereof. In some aspects of the composition, the surfactant composition can further include anionic surfactants with amphoteric surfactants and nonionic surfactants or mixtures thereof.

The claimed compositions and methods are effective for tight subterranean rock formations and enhanced hydrocarbon recovery of subterranean formations.

BRIEF DESCRIPTION OF THE DRAWINGS

FIG. 1 is a graphical representation of the imbibition test for different formulations of an embodiment of the disclosure.

DETAILED DESCRIPTION

Although the present disclosure provides references to various embodiments, persons skilled in the art will recognize that changes may be made in form and detail without departing from the spirit and scope of the claimed invention.

Various embodiments will be described in detail with reference to the figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the various embodiments of the claimed invention. All publications, patent applications, patents and other references mentioned herein are incorporated by reference in their entirety.

As used herein, the term "enhanced hydrocarbon recovery" or "enhanced oil recovery" refers to injection of compositions into a subterranean formation to increase the rate or total amount of hydrocarbon collected from a previously established well. Enhanced hydrocarbon recovery includes "secondary hydrocarbon (oil) recovery" which includes injection initiated when a reduction in the rate of flow of hydrocarbon from a well is observed. Enhanced hydrocarbon recovery also includes "tertiary hydrocarbon (oil) recovery," which includes injection initiated when rate of flow of hydrocarbon from a well has stopped or substantially stopped.

As used herein, the term "high pressure" means pressure in excess of atmospheric pressure on the surface of the earth, or as encountered within one or more subterranean formations or subterranean formations as a result of natural forces present within the subterranean formation, as a result of human activity such as hydraulic fracturing, or a combination thereof.

As used herein, the term "high temperature" refers to a water source, a subterranean formation, or a combination thereof having a temperature of about 60° C. to 120° C., as specified or determined by context.

As used herein, the term "high total dissolved solids" refers to a water source including at least about 0.5 wt % solids dissolved therein, and in some embodiments up to about 30 wt % solids dissolved therein. In general, "saline" or "salinity" refers to a water source wherein a portion or a substantial portion of the total dissolved solids are salts.

As used herein, the term "hydrocarbon" generally refers to crude petroleum products, such as crude oil or natural gas products such as methane, unless otherwise specified or determined by context. Crude petroleum products are hydrocarbon compounds as recovered or collected from a subterranean formation, and prior to any further processing or refining thereof.

As used herein, the term "nanoparticle" means particles having at least one dimension less than 500 nm.

As used herein, the term "surfactant" means a compound having at least one hydrophilic portion and at least one hydrophobic portion, wherein the compound is capable of spontaneous self-aggregation in aqueous compositions.

As used herein, the term "cationic surfactant" means a surfactant having no anionic moieties covalently bonded to the molecule and one or more cationic moieties covalently bonded to the molecule.

As used herein, the term "anionic surfactant" means a surfactant having no cationic moieties covalently bonded to the molecule and one or more anionic moieties covalently bonded to the molecule.

As used herein, the term "nonionic surfactant" means a surfactant having no ionic moieties covalently bonded to the molecule.

As used herein, the term "amphoteric surfactant" means a surfactant having one or more anionic moieties covalently bonded to the molecule and one or more cationic moieties covalently bonded to the molecule, and a net molecular charge of zero. Stated differently, an amphoteric surfactant is an electrically neutral compound having formal unit electrical charges of opposite sign.

As used herein, the term "tight rock" means solid subterranean rock having permeability of 0.1 milliDarcy (mD) or less and hydrocarbon entrained within the rock matrix. "Very tight rock" indicates permeability of 0.01 mD or less.

As used herein, the term "water source" means a source of water comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist essentially of ionic compounds. Generally, the term "water source" includes all of the following unless otherwise specified or determined by context:water, connate, produced water, water having high total dissolved solids, water having high temperature, and water having both high total dissolved solids and high temperature. The terms "waterbased", "water solution", "aqueous" and the like generally refer to a composition including a water source The term "produced water" refers to a water source that is present within and/or flows from a subterranean formation; produced water includes connate unless otherwise specified.

As used herein, the term "injectate" means a composition for injecting into a subterranean formation, or a composition that is injected into a subterranean formation, or a composition previously injected into a subterranean formation and present therein. The injectate may further include a proppant, wherein the combination of injectate and proppant is referred to herein as a "fracturing fluid." Discussions related to injectates and injection of injectates generally also relates to fracturing fluids and injection of fracturing fluids, as specified or determined by context. It will be understood that the proppant present in a fracturing fluid does not materially affect the chemical properties of the injectate but instead is chemically inert or substantially chemically inert within the fracturing fluid. As such, discussions relating to improved rate or yield of hydrocarbon from a subterranean formation due to injection of an injectate, including modification of properties such as interfacial energy or rock surface wettability also apply generally to fracturing fluids, unless otherwise specified or determined by context.

As used herein, the term "well" refers to a fluid connection between a hydrocarbon within a subterranean formation, and a point proximal to the surface of the earth suitably situated to collect at least a portion of the hydrocarbon. Optionally, the point of collection is further adapted to collect the hydrocarbon, or to inject an injectate into the subterranean formation, or both. Similarly, the term "wellbore" refers to a man-made fluid connection to a hydrocarbon within a subterranean formation. A wellbore is adapted to collect the hydrocarbon, or to inject an injectate into the subterranean formation, or both, for example by including one or more pipes, tanks, pumps and the like. A well may include one wellbore, or two or more wellbores.

As used herein, the term "wettability" refers to the preference of a solid surface (e.g. rock formation) to be in contact with one fluid over another.

As used herein, the term "water wet" refers to the preference of a solid surface to be in contact with water.

As used herein, the term "oil wet" refers to the preference of a solid surface to be in contact with oil.

As used herein, the word "treatment" refers to any treatment for changing a condition of a wellbore or a subterranean formation. Examples of treatments include fluid-loss control, isolation, stimulation, or conformance control; however, the word "treatment" does not necessarily imply any particular treatment purpose.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making complexes, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" and includes "consisting of." "Consisting essentially of" and "consisting of" are construed as in U.S. patent law. For example, a solution that is "substantially free" of a specified complex or material may be free of that complex or material, or may have a minor amount of that complex or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Disclosed herein are compositions that include surface-modified nanoparticles and surfactants, methods of production of such compositions, and methods of treating a subterranean formation with such compositions. A combination of both surface-modified nanoparticles and surfactants is found to be more effective than each individual component alone at treating a subterranean formation and well bores. The compositions and methods improve in breaking and displacing deposits from the solid substrate, altering the wettability, and increasing the relative permeability of the subterranean formation to hydrocarbons. In some embodiments, the composition changes the wettability of rock present in a subterranean formation from oil wet to water wet by reducing the preferred hydrocarbon contact to the rock and thereby increases the hydrocarbon flow out of the subterranean formation. Reducing the oil-water interfacial tension increases the rate of oil recovery from a subterranean formation and in some cases also increases total yield from the subterranean formation.

Nanoparticles are particles that have at least one dimension less than about 500 nm. In some embodiments, at least one dimension of the nanoparticles range from 1-500 nm. In some embodiments, the nanoparticles range from 1-400 nm; 1-250 nm; 1-100 nm; 200-500 nm; 200-400 nm; or 300-400 nm. Particles smaller than about 100 nm (viz., particles having at least one dimension less than about 100 nm) are known to remain suspended in solution, rather than settling out under the influence of gravity. Nanoparticles may assume a variety of geometries, such as spheres, hollow shells, rods, plates, ribbons, prisms, stars, and combinations thereof. All geometries of nanoparticle are understood to be suitable. For example, a particle of 2 μm length and 50 nm diameter would be considered a "nanoparticle" even though one of its dimensions is larger than 500 nm. Similarly, a carbon rod of 10 nm diameter and 5 μm length would be considered a nanorod (viz., a rod like nanoparticle).

In some embodiments, the size of a nanoparticle refers to the diameter or approximate diameter of a nanoparticle. For a population of nanoparticles, this can also be referred to as a Z-average particle size, which can be measured according to routine protocols known to one skilled in the art. In some embodiments, the size is measured by dynamic light scattering (DLS) (Z-average). In some embodiments, the size is measured by Transmission Electron Microscopy (TEM).

In some embodiments, the nanoparticles are selected from aluminum, carbon, chromium, cobalt, copper, gold, iron, magnesium, nickel, platinum, silicon, silver, tin, titanium and zinc nanoparticles. In some embodiments, any of the nanoparticles described herein are mineral oxide nanoparticles. For example, the nanoparticles are aluminum oxide, antimony dioxide, copper oxide, iron oxide, magnesium oxide, nickel oxide, silicon dioxide, titanium oxide, zinc oxide, or zirconium dioxide nanoparticles. In some embodiments, the nanoparticles are selected from are $Al_2O_3$, $Al(OH)_3$, $Bi_2O_3$, $CeO_2$, CoO, $Co_{203}$, $CO_3O_4$, $Cr_2O_3$, CuO, $Cu_2O$, $Cu(OH)_2$, $Fe_2O_3$, $Fe_3O_4$, MgO, $Mg(OH)_2$, $MgCO_3$, $MnO_2$, $Mn_3O_4$, $Ni(OH)_2$, NiO, $SiO_2$, $SnO_2$, $TiO_2$, ZnO, $ZnCO_3$, $ZrO_2$, and $Zr(OH)_4$. In some embodiments, any of the nanoparticles described herein are selected from the group consisting of $BaCO_3$, $BaTiO_3$, $BaSO_4$, $CoFc_2O_4$, $CaCO_3$, $MnFc_2O_4$, $MgCO_3$, $ZnCO_3$, $SrCO_3$, and $SrTiO_3$.

In some embodiments, the nanoparticles are silica nanoparticles. In some embodiments, the silica nanoparticles are silicon dioxide nanoparticles.

In some embodiments, non-silica nanoparticles (viz., other than substantially silica) can be treated or prepared to have a surface layer of silica (hereinafter referred to as silica surface-modified nanoparticles).

Several methods are known for attaching functional groups (e.g. silica) to the nanoparticles to provide surface-modified nanoparticles such as silica. See, e.g., Ralph K. Iler, The Chemistry of Silica: Solubility, Polymerization, Colloid and Surface Properties, and Biochemistry, Wiley-Interscience, N Y, 1979; VanDerVoort, P. and Vansant, E. F., Journal of Liquid Chromatography and Related Technologies, 19:2723-2752, 1996; or Energy & Fuels 2017, 31, 2663-2668; Soft Matter, 2016, 12, 2025-2039; SPE-179576-MS presented at the SPE Improved Oil Recovery Conference, 11-13 Apr. 2016; SPE-186328-MS presented at the SPE/ATMI Asia Pacific Oil & Gas Conference and Exhibition, 17-19 Oct. 2017; Energy & Fuels 2018, 32, 287-293.

The chemical group can itself be the functional group, or it can serve as a substrate to which other functional groups can be coupled. Therefore, in some embodiments, the morphology for nanoparticles is a “core-shell” morphology, where a core comprises material other than silica and the shell comprises silica.

In some embodiments the silica nanoparticles are surface treated with silane surface-coupling agents. In some embodiments, the nanoparticle surfaces are modified with surface-coupling agents derived from organic silane surface groups. The surface-coupling agent is selected from silane, aryl silane, alkoxysilane, alkyl, and combinations thereof. In some embodiments, the silane surface-coupling agents have epoxy groups. In some embodiments the silane coupling agents are 3-glycidoxypropyltrimethoxysilane, 3-glycidoxypropyltricthoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl) propyltrimethoxysilane, 2-(3,4-epoxycyclohexyl) propyltriethoxysilane, 2-(3,4-epoxycyclohexyl) ethyltrimethoxysilane, 2-(3,4-epoxycyclohexyl) ethyltriethoxysilane, 2-(3,4-epoxycyclohexyl) methyltrimethoxysilane, 2-(3,4-epoxycyclohexyl) methyltriethoxysilane, [(3-ethyl-3-oxcthanyl)methoxy] propyltrimethoxysilane, and [(3-ethyl-3-oxcthanyl) methoxy]propyltricthoxysilane.

In some embodiments, the ratio of the surface modification compound to the nanoparticle (e.g. colloidal nanoparticles) is 0.1 to 15; 0.1:10; or 0.1:5 based on the mass of silica solid content. In some embodiments, the ratio of silane compound to the silica (e.g. colloidal silica) is 0.01 to 15; 0.1 to 15; 0.1:10; 0.1:5; or 0.01 to 5 based on the mass of silica solid content.

In some embodiments, the surface-modified nanosilica particles are used for producing zwitterionic groups as a reaction of a silane molecule with a silica surface. In some embodiments the silane is a zwitterionic silane. In some embodiments a zwitterionic silane is zwitterionic sulfonate functional silane, zwitterionic carboxylate functional silane, zwitterionic phosphate functional silane, zwitterionic phosphonic acid functional silane.

In some embodiments a zwitterionic silane is N,N-dimethyl,N-(2-ethyl phosphate cthyl)-aminopropyltri-methyoxysilane (DMPAMS) or 3-(dimethyl(3-(trimethoxysilyl) propyl)-ammonio) propane-1-sulfonate or 3-(dimethyl (3-(triethoxysilyl) propyl)-ammonio) propane-1-sulfonate; or 3-(diethyl (3-(trimethoxysilyl) propyl)-ammonio) propane-1-sulfonate.

Methods for preparing silica surfaces to which zwitterions are attached will be described with particular attention to silica nanoparticle surfaces and zwitterion alkoxysilane. However, this should be understood as only illustrative and it will be readily understood by those of ordinary skill in the art that similar techniques may be adapted and applied to the other surfaces, nanoparticles types and zwitterion compositions as discussed herein. In some embodiments, the method for bonding zwitterion groups to silica nanoparticle surfaces is a dispersion or solution of such nanoparticles treated with a zwitterion alkoxysilane. In some embodiments, the nanoparticle concentration in the solution is between about 0.01 wt % and about 30 wt % and the concentration of zwitterion alkoxysilane is that which provides enough zwitterion alkoxysilane to be sufficient to react with SiOH present on the surface. The amount of zwitterionic alkoxane may be determined by the diameter and specific surface area of the nanoparticle. The medium for reaction comprises between 0 and 100% water, the balance (if any) being made up by an organic solvent such as ethanol, methanol, dimethylformamide (DMF), dimethyl sulfoxide (DMSO), 1,4 dioxane, tetrahydrofuran (THF), acetonitrile, acetone, n-butanol, isopropanol, and n-propanol. If an organic solvent system is to be used, sufficient water must be present to promote the hydrolysis/condensation reactions that attach the zwitterion silane to the surface. The amount of water is typically between 1 ppm and 1%.

In some embodiments the nanoparticles can be in the form of colloidal particles. Colloid particles are particles from 1 to 100 nm, from 30 to 100 nm or 50-100 nm in one dimension. Colloidal systems are termed dispersions (or sols for solid-liquid systems). In some embodiments, the nanoparticles are a dispersion of colloidal silica particles. In some embodiments, the dispersion contains 10 to 50 weight percent solids of which 10 to 70 weight percent is colloidal silica and 30 to 90 weight percent is the aqueous solvent. In some embodiments, the aqueous solvent used for the dispersion is water. In some embodiments, the colloidal silica dispersion is a silanized colloidal silica.

Nonporous spherical silica particles in aqueous media (sols) are well known in the art and are available commercially; for example, as silica sols in water or aqueous alcohol solutions under the tradenames LUDOX, or NYACOL from Nyacol Co. of Ashland, MA, or other sols from Nalco Chemical Co. of Naperville, IL.

In some embodiments, the surface-modified nanoparticles are from 1-500 nm. In some embodiments, the surface-modified nanoparticles are silica surface-modified nanoparticles that range from 1-500 nm; 1-400 nm; 1-250 nm; 1-100 nm; 10-50 nm; 200-500 nm; 200-400 nm; or 300-400 nm. Particles smaller than about 100 nm (viz., particles having at least one dimension less than about 100 nm).

The composition also includes one or more surfactants. The desired surfactants are ones that aid in increased hydrocarbon yield such as crude oil, from subterranean formations; or result in increased rate of hydrocarbon recovery or both, by lowering a subterranean interfacial tension.

In some embodiments the surfactants are a blend of two or more amphoteric surfactants and nonionic surfactants. The amphoteric surfactant, also termed a zwitterionic surfactant, includes at least one internal anionic moiety, at least one internal cationic moiety, and has a net internal charge of zero. In some embodiments, the amphoteric surfactant comprises, consists essentially of, or consists of a single internal cation, a single internal anion, and a hydrophobic moiety selected from linear, branched, alicyclic, aryl, and alkaryl groups having 6 to 50 carbon atoms. In some embodiments, the amphoteric surfactant includes at least one internal cationic moiety comprising ammonium or phosphonium; and at least one internal anionic moiety comprising sulfonate, sulfate, oxide, carboxylate, phosphate, phosphite, or phosphonate. In some embodiments, the amphoteric surfactant includes at least one internal cationic moiety comprising ammonium or phosphonium; and at least one internal anionic moiety comprising sulfonate. In some embodiments, the amphoteric surfactant includes at least one internal hydroxyl group.

Examples of useful amphoteric surfactants include those having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. One useful class of amphoteric surfactants is amino acids having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms, including for example N-dodecyl-N,N-dimethyl glycine. Another class of useful amphoteric surfactants is trialkylamine oxides having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. Representative examples of such amphoteric surfactants include N,N-dimethyl-N-dodecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide.

Another class of useful amphoteric surfactants is betaines, which include one internal carboxylate moiety, one internal ammonium moiety, and a hydrophobic moiety selected from linear, branched, alicyclic, alkyl, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. Representative but nonlimiting examples of betaines include 2-(dodecyldimethylammonio) acetate (CAS No. 683-10-3), cocamidopropyl betaine (2-[3-(dodecanoylamino)propyl-dimethylazaniumyl]acetate), dodecanamidopropyl betaine ({2-[3-(dodecanoylamino)propyl]triazan-2-ium-2-yl}acetate), cetyl betaine (2-[hexadecyl(dimethyl)azaniumyl]acetate), oleamidopropyl betaine ((Z)-(carboxymethyl)dimethyl-3-((1-oxo-9-octadecenyl)amino)propylammonium hydroxide), caprylamidopropyl betaine (2-[dimethyl-[3-(octanoylamino)propyl]azaniumyl]acetate), and C10-16-alkyl (2-hydroxy-3-sulfopropyl)dimethyl (Mackam™ LHS supplied by Solvay.)

Another class of useful amphoteric surfactants is sultaines, which include one internal sulfonate moiety and one internal ammonium moiety (also referred to as sulfobetaines). Examples of sultaines are lauryl sulfobetaine (3-(dodecyldimethylammonio)propane-1-sulfonate), caprylyl sulfobetaine (3-[decyl(dimethyl)azaniumyl]propane-1-sulfonate), myristyl sulfobetaine (3-[dimethyl(tetradecyl)azaniumyl]propane-1-sulfonate), Sulfobetaine 10 (CAS No. 15163-36-7), Sulfobetaine 3-14 (N-tetradecyl-N,N-dimethyl-3-ammonio-1-propanesulfonate), Sulfobetaine 3-10 (N-decyl-N,N-dimethyl-3-ammonio-1-propanesulfonate); alkylether hydroxypropyl sultaines and alkyldimethylhydroxysultaines such as lauryl hydroxysultaine (3-[dodecyl(dimethyl)ammonio]-2-hydroxypropane-1-sulfonate; 351.55 g/mol; CAS No. 13197-76-7), myristamidopropyl hydroxysultaine (2-hydroxy-N,N-dimethyl-N-(3-((1-oxotetradecyl)amino)propyl)-3-sulfo-, inner salt); cocoamidopropyl hydroxysultaine, and the like. Mixtures of such surfactants having various carbon chain lengths are obtained in some embodiments; for example, 3-((C10-C16)-alkyldimethylammonio)-2-hydroxypropanesulfonate (CAS No. 72869-77-3) is a mixture of alkylated moities having an average of 10 to 16 carbons.

Another class of useful amphoteric surfactants is phosphate functional amphoteric surfactants, which include one internal phosphate moiety, one internal ammonium moiety, optionally a carboxylate moiety, and either one or two hydrophobic moieties, wherein each hydrophobic moiety is selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of phosphate functional amphoteric surfactants include phosphatidylserines, phosphatidylethanolamines, phosphatidylcholines such as 1-oleoyl-2-palmitoyl-phosphatidylcholine, and sphingomyelins.

In some embodiments the nonionic surfactants are one or more surfactants selected from the group comprising, consisting essentially of, or consisting of alkoxylated alcohols, alkoxylated alkyl phenols, or ethylene oxide/propylene oxide copolymers. In other embodiments the nonionic surfactants are alkoxylated alcohols, alkoxylated alkyl phenols, or ethylene oxide/propylene oxide copolymers having an hydrophilic-lipophilic balance (HLB) greater than about 10. having an HLB greater than about 10, for example about 10 to 20, or about 10 to 18, or about 10 to 16, or about 10 to 14, or about 11 to 20, or about 11 to 18, or about 11 to 17, or about 11 to 16, or about 11 to 15, or about 11 to 14, or about 11 to 13, and mixtures of these compounds.

In some embodiments, the nonionic surfactants are ethoxylated C6-C14 or C10-C14 alcohols and alkyl phenols. In some embodiments the nonionic surfactants are polyoxyethylene alkyl ether, polyoxyethylene alkylphenol ether, ethylene oxide-propylene oxide block copolymers, alkyl glucoside, polyoxyethylene fatty acid ester, sucrose fatty acid ester, sorbitan fatty acid ester, polyoxyethylene sorbitan fatty acid ester, and fatty acid alkanolamide. In some embodiments the nonionic surfactant is ethoxylated castor oil, dimethyl-lauryl-amine, C10-16 alkyl dimethylamines, alkoxylated ethylenediamine, ethoxylated alcohol, ethoxylated hexanol or mixtures thereof.

In some embodiments, the weight ratio of the amphoteric surfactant to the nonionic surfactant in the compositions is about 10:1 to 1:10, or about 9:1 to 1:10, or about 8:1 to 1:10, or about 7:1 to 1:10, or about 6:1 to 1:10, or about 5:1 to 1:10, or about 4:1 to 1:10, or about 3:1 to 1:10, or about 2:1 to 1:10, or about 1:1 to 1:10, or about 10:1 to 1:5, or about 9:1 to 1:5, or about 8:1 to 1:5, or about 7:1 to 1:5, or about 6:1 to 1:5, or about 5:1 to 1:5, or about 4:1 to 1:5, or about 3:1 to 1:5, or about 2:1 to 1:5, or about 1:1 to 1:5, or about 10:1 to 1:3, or about 9:1 to 1:3, or about 8:1 to 1:3, or about 7:1 to 1:3, or about 6:1 to 1:3, or about 5:1 to 1:3, or about 4:1 to 1:3, or about 3:1 to 1:3, or about 2:1 to 1:3, or about 1:1 to 1:3, or about 10:1 to 1:2, or about 9:1 to 1:2, or about 8:1 to 1:2, or about 7:1 to 1:2, or about 6:1 to 1:2, or about 5:1 to 1:2, or about 4:1 to 1:2, or about 3:1 to 1:2, or about 2:1 to 1:2, or about 1:1 to 1:2, or about 10:1 to 1:1, or about 9:1 to 1:1, or about 8:1 to 1:1, or about 7:1 to 1:1, or about 6:1 to 1:1, or about 5:1 to 1:1, or about 4:1 to 1:1, or about 3:1 to 1:1, or about 2:1 to 1:1.

In other embodiments, the molar ratio of the amphoteric surfactant to the nonionic surfactant in the compositions is about 10:1 to 1:3, or about 9:1 to 1:3, or about 8:1 to 1:3, or about 7:1 to 1:3, or about 6:1 to 1:3, or about 5:1 to 1:3, or about 4:1 to 1:3, or about 3:1 to 1:3, or about 2:1 to 1:3, or about 1:1 to 1:3, or about 10:1 to 1:2, or about 9:1 to 1:2, or about 8:1 to 1:2, or about 7:1 to 1:2, or about 6:1 to 1:2, or about 5:1 to 1:2, or about 4:1 to 1:2, or about 3:1 to 1:2, or about 2:1 to 1:2, or about 1:1 to 1:2, or about 10:1 to 1:1, or about 9:1 to 1:1, or about 8:1 to 1:1, or about 7:1 to 1:1, or about 6:1 to 1:1, or about 5:1 to 1:1, or about 4:1 to 1:1, or about 3:1 to 1:1, or about 2:1 to 1:1.

In some embodiments the surfactants are a blend of amphoteric surfactants, anionic surfactants, nonionic surfactants and mixtures thereof. In some embodiments, the anionic surfactants are salts (including, for example, sodium, potassium, ammonium, and substituted ammonium salts such as mono-, di-, and triethanolamine salts) of the anionic sulfate, sulfonate, carboxylate and sarcosinate surfactants. In other embodiments, the anionic surfactants are isethionates such as the acyl isethionates, N-acyl taurates, fatty acid amides of methyl tauride, alkyl succinates, sulfoacetates, and sulfosuccinates, monoesters of sulfosuccinate (e.g., saturated and unsaturated $C_{12}$-$C_{18}$ monoesters), diesters of sulfosuccinate (e.g., saturated and unsaturated $C_6$-$C_{14}$ diesters), and N-acyl sarcosinates.

In some embodiments the anionic surfactant is a sulfosuccinate. In some embodiments the sulfosuccinate are C8-C22 sulfosuccinates. In still other embodiments the anionic surfactant is sodium dodecylbenzene sulfonate, nacconol 90G, dioctyl sodium sulfosuccinate, sodium-toluene sulfonate, sodium benzene sulfonate, linear alkylbenzene sulfonates (LAS) or sodium dodecyl sulfate (SDS).

In some embodiments, the weight ratio of the amphoteric surfactant to the nonionic surfactant to the anionic surfactant in the surfactant compositions is about 100:1:1; 1:100:1; 1:1:100; 10:1:1; 1:10:1; 1:1:10; or 1:1:1.

Solvents employed in the compositions (concentrates, injectates, and/or fracturing fluids) comprise, consist essentially of, or consist of coupling agents and water sources. Suitable coupling agents employed in the compositions (concentrates and injectates) comprise, consist essentially of, or consist of water miscible compounds and mixtures of two or more water miscible compounds, wherein the compounds are liquid at temperatures above −40° C. or even lower. The coupling agents do not destabilize the compositions. In some embodiments, the coupling agents increase stability of the compositions. In some embodiments, the coupling agents provide both shelf stability of the concentrates and also impart pourability, pumpability, or flow to the concentrates at temperatures of about −40° C. and up to 100° C. In many embodiments, the coupling agent is fully miscible with water; that is, all possible coupling agent:water ratios may be formed without separation. In other embodiments, the coupling agent is miscible with water at least up to about 20:1 to 1:20 water:coupling agent by volume, or about 20:1, about 19:1, about 18:1, about 17:1, about 16:1, about 15:1, about 14:1, about 13:1, about 12:1, about 11:1, about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:11, about 1:12, about 1:13, about 1:14, about 1:15, about 1:16, about 1:17, about 1:18, about 1:19, or about 1:20 water:coupling agent by volume.

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether), polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate. In some embodiments, the coupling agent comprises, consists essentially of, or consists of methanol, ethanol, propanol, butanol, glycerol, ethylene glycol, ethylene glycol monoalkyl ether wherein the ether moiety comprises 1 to 6 carbon atoms, or a combination of two or more thereof. In some embodiments, the coupling agent is ethylene glycol and diethylene glycol.

The total amount of coupling agents included in the concentrate is about 5 wt % to 30 wt % based on the total weight of a concentrate, for example about 5 wt % to 25 wt %, or about 5 wt % to 20 wt %, or about 5 wt % to 15 wt %, or about 6 wt % to 30 wt %, or about 7 wt % to 30 wt %, or about 8 wt % to 30 wt %, or about 9 wt % to 30 wt %, or about 10 wt % to 30 wt based on the total weight of a concentrate. The coupling agent is generally not included in the list of "actives" or active ingredients, but is present in the concentrate to promote and increase storage stability of the concentrate as well as facilitate stability of the composition during dilution of the concentrate to form an injectate. Additionally, in some embodiments the coupling agents further suppress the freezing point of the concentrate which is advantageous for winter storage and transportation purposes. Finally, in some embodiments the coupling agents reduce the viscosity of a concentrate, increasing the pumpability and pourability of the concentrate over a range of field use temperatures In some embodiments, the weight ratio of surface-modified nanoparticle to surfactant composition in the composition is 100:1 to 1:100, more often about 1:1 to 1:100; for example, 50:1 to 1:100, or 20:1 to 1:100, or 10:1 to 1:100, or 1:5 to 1:100, or 1:10 to 1:100, or 1:20 to 1:100, or 1:30 to 1:100, or 1:40 to 1:100, or 1:50 to 1:100, or 1:60 to 1:100, or 1:70 to 1:100, or 1:80 to 1:100, or 1:90 to 1:100, or 1:1 to 1:90, or 1:1 to 1:80, or 1:1 to 1:70, or 1:1 to 1:60, or 1:1 to 1:50, or 1:1 to 1:40, or 1:1 to 1:30, or 1:1 to 1:20, or 1:1 to 1:10, or 1:1 to 1:9, or 1:1 to 1:8, or 1:1 to 1:7, or 1:1 to 1:6, or 1:1 to 1:5, or 1:1 to 1:4, or 1:1 to 1:3, or 1:1 to 1:2.

In some embodiments, the surface-modified nanoparticles are 10 to 50 wt % based on the total weight of the composition. In other embodiments, the surface-modified nanoparticle is 10-40 wt %, 20-50 wt %, 30-40 wt %, 40-50 wt % and 20-40 wt % based on the total weight of the composition.

The composition comprising, consisting essentially of, or consisting of combination of the surface-modified nanoparticles and surfactants can be variously formulated. In some embodiments, the composition is an injectate. An injectate is any aqueous composition that is injected into a subterranean formation to bring about an increase in yield or rate of recovery of a hydrocarbon from the subterranean formation. In some embodiments, the composition is a concentrate. In some embodiments the composition is a fracturing fluid or drilling fluid.

In some embodiments, the composition comprises, consists essentially of, or consists of a surface-modified nanoparticle, a stability component, and a surfactant composition, the surfactant composition comprising, consisting essentially of, or consisting of amphoteric surfactants and nonionic surfactants or mixtures thereof, a solvent selected from a water source, coupling agent or mixture thereof.

In some embodiments, the composition comprises, consists essentially of, or consists of a surface-modified nanoparticle, a stability component, and a surfactant composition, the surfactant composition comprising, consisting essentially of, or consisting of amphoteric surfactants, nonionic surfactants, anionic surfactants, or mixtures thereof, a solvent selected from a water source, coupling agent or mixture thereof.

When a stability component was added to the composition or in the preparation of the nanoparticle, the disclosed compositions or nanoparticles were found to be stable when used at high temperatures, high salinity, or were storage stable or variations thereof. In some embodiments the stability component is a sulfate, chloride, carbonate, or oxide salt of aluminum, titanium or zirconium. In some embodiments the stability component is from 0.1-10 wt % of the composition. In some embodiments, the stability component is aluminum sulfate and in other embodiments the aluminum sulfate is from 0.1-10 wt % of the composition.

In some embodiments, the disclosed compositions do not exhibit cloudiness, precipitation, separation, gelation, or any other behavior attributable to instability. In some embodiments, the disclosed compositions are thermally stable when subjected to underground conditions including temperatures of about 60° ° C. to 250° C. In some embodiments, the disclosed compositions are made using produced water and are suitable for injection into a subterranean formation, where the fluids remain stable and do not cause precipitation, separation, or another behavior attributable to instability, while flowing underground. This in turn results in optimal recovery of hydrocarbons from the subterranean formation. The disclosed compositions are particularly useful for increasing the yield of hydrocarbon products from subterranean formations where high temperatures, high salinity or both are encountered underground.

In some embodiments, the compositions (e.g. injectates) are stable both before and after subterranean injection. That is, the compositions do not phase separate, exhibit cloudiness, precipitation, separation, gelation, or any other behavior attributable to instability in the presence of produced water, rock surfaces, high temperature, high pressure or the combinations thereof. For example, the compositions do not phase separate or otherwise show instability at temperatures of about 100° C. to 250° C., or about 100° C. to 200° C.; about 100° C. to 190° C., or about 100° C. to 180° C., or about 100° C. to 170° C., or about 100° C. to 160° C., or about 100° ° C. to 150° C., for periods of at least 7 days to 90 days, or for a period of 7 days to 90 days, or 7 days to 80 days, or 7 days to 70 days, or 7 days to 60 days, or 7 days to 50 days, or 7 days to 40 days, or 7 days to 30 days. Further, in some embodiments the compositions are stable for the foregoing periods of time and/or at the foregoing temperatures under high pressure (pressure in excess of atmospheric pressure on the surface of the earth) such as pressure encountered naturally in subterranean environments, pressure applied during hydraulic fracturing or another human-facilitated subterranean process, or a combination thereof.

The disclosed compositions may include additional components or additives, such oxidizing agents, water-soluble enzymes, clay stabilizers, corrosion inhibitors, scale inhibitors, viscosifying agents, flow back aids, friction reducers, proppants, biocides, buffers, or in various combinations depending on the chemical and physical attributes of the particular subterranean formation. In some embodiments the additive includes oil field additives conventionally used in hydraulic fracturing or post-primary fracturing of subterranean hydrocarbon-containing formations. In some embodiments, the additives are added to the concentrates, and the resulting concentrates are stable, or even storage stable. In other embodiments, the additives are not added to the concentrate, but rather are added to the subterranean formation contemporaneously with dilution of the concentrate to form an injectate, or are added to the injectate after the injectate is formed.

In some embodiments, an injectate is formed by combining one or more surface-modified nanoparticles with one or more surfactants with a water source. The water source is water or water with one or more solids dissolved therein. In some embodiments the water source includes 0.5 wt % and as much as 30 wt % dissolved solids in the form of salts or ions, or from 0.5-30 wt %, from 1-15 wt %, from 10-30 wt % or from 20-30 wt % dissolved solids in the form of salts or ions. In some embodiments, the water source is at a temperature of 20° C. to 80° C. during the combining.

Any of the compositions described herein are used to recover or enhance the effectiveness of recovering hydrocarbons. Disclosed herein are methods of treating a subterranean formation, comprising, consisting essentially of, or consisting of, introducing into the subterranean formation any of the compositions described herein. In some embodiments, the introduction is by injecting the fluid into a subterranean formation to be treated. In some embodiments, the composition breaks up deposits present in the subterranean formation, alters the wettability of the subterranean formation to water wet, and increases the relative permeability of the subterranean formation to hydrocarbons or combinations thereof. In some embodiments, break up of deposits, the alteration of the wettability of the subterranean formation to water wet, and/or the increase of the relative permeability of the subterranean formation for hydrocarbons results in the increased flow of hydrocarbons from the subterranean formation. In some embodiments, the compositions can be used to improve relative permeability to hydrocarbon. The compositions described herein can also be used to increase the production of hydrocarbons from a subterranean formation that has already been subject to prior subterranean formation stimulation such as hydraulic fracturing or matrix stimulation. In some embodiments, the compositions can be used to enhanced oil recovery stimulation where compositions are pumped with water into injection well(s) and the oil is recovered from production well(s). In some embodiments, the compositions can be used as additives to stimulation fluids (such as hydraulic fracturing fluids) to alter rock wettability to water wet and reduce water leak-off. In some embodiments, the compositions can be injected with other treatment fluids into the formation prior to pumping the stimulation fluids.

In some embodiments, the composition (e.g. injectate) is disposed within the subterranean formation for at least 7 to 90 days, where it does not separate, precipitate or coagulate. In other embodiments, the method includes injecting an injectate into a first well which is in fluid connection with a subterranean hydrocarbon-containing formation, followed by collecting one or more hydrocarbon compounds from the first well. In other embodiments, the method includes injecting an injectate into a first well which is in fluid connection with a subterranean hydrocarbon-containing formation, followed by collecting one or more hydrocarbon compounds from a second well, wherein the second well is also fluidly connected to the subterranean hydrocarbon-containing formation. In some embodiments, one or more such wells are wellbores-namely is, man-made fluid connections to a subterranean formation that is further adapted to collect the hydrocarbon.

After subterranean injection, rock contacted by the composition according to any of the above embodiments changes from oil-wettable to water-wettable.

In some embodiments, the introducing (e.g. injecting) of the composition is carried out after hydraulic fracturing of the subterranean formation. In some embodiments, the composition is injected into a subterranean formation wherein no hydraulic fracturing has been carried out. In other embodiments, injecting of the composition is carried out contemporaneously with hydraulic fracturing of the subterranean formation. In some embodiments the composition and methods are particularly useful in secondary and tertiary oil recovery, collectively referred to herein as enhanced oil recovery, which is any injection carried out after the fluid connection of a well is already established. In some embodiments, the composition and methods are particularly useful in obtaining hydrocarbon from tight or very tight subterranean rock formation.

In some embodiments, a method to enhance hydrocarbon displacement is to alter the wettability of a subterranean formation. Wettability is a tendency of a liquid to spread on a solid surface. Whereas non-wettability means the liquid will ball up and may run off the surface. Wettability therefore can control the distribution of the fluids in a subterranean formation and effects oil recovery. Contact angles are used as a measure of wettability. The contact angle is the angle at which the liquid-vapor interface meets the solid-liquid interface. If the contact angle is small (viz., less than 90°), and the fluid spreads to cover or "wet" a larger area of the solid surface and is considered effective at wetting. If the contact angle is large (viz., greater than 90°), and the fluid forms a compact, self-contained droplet on the solid surface, the solid surface is considered as not-wettable. If the contact angle of water on a surface is small, the surface may be said to be "water-wetted" or "water-wettable," whereas if the contact angle of an oil droplet on a surface is small, the surface may be said to be "oil-wetted" or "oil-wettable."

In some embodiments, a water-wet surface has a contact angle for water between 0 to 90 degrees as measured from the surface. A surface having a contact angle at or above ninety degrees for water is described as non-water wet. Similarly, an oil-wet surface has a contact angle for oil between 0 to 90 degrees. A surface having a contact angle at or above ninety degrees for oil is described as non-oil wet.

In some embodiments are methods and compositions for changing the wettability of solid surfaces in subterranean formations and wells. In some embodiments, the composition injected into a well formation alters the wettability of the formation when the fluid contacts the formation. The contact angle can be determined under standard laboratory conditions or under simulated bottom-hole conditions of temperature and pressure, whichever may be adequate or most useful to the application of the method. The wettability of a surface can be altered for water or for an oil.

In some embodiments is a method of altering the water wettability of a surface in a well, the method comprises the step of introducing a treatment fluid into a well to contact the solid surface, wherein the contact angle of water on the solid surface is altered at least 10°; at least 20°; at least 30°, at least 40°, or from 10-30°, 30-50°, or 50-90°. In some embodiments, the contact angle of the water drop on oil-saturated rock surface is from 0-90°, 1-80°, 0-70°, 0-60°, 0-50°, or 10-20°.

In still other embodiments, the contact angle of an oil drop on an oil-saturated rock surface is 0° or substantially 0°; by contacting the oily rock surface with the composition, the contact angle of an oil drop on the contacted rock surface is changed to about 60° to 100°, or about 60° to 95°, or about 60° to 90°, or about 70° to 100°, or about 80° to 100°, or about 70° to 90°, or about 80° to 90°.

Contact angles may be measured by any known method in the art. For example, the contact angle can be measure by a contact angle goniometer. In some embodiments, the contact angle is measured via inverted sessile drop. In the inverted sessile drop, a chip is placed in a glass cell and filled with a surfactant and/or nano particle solution. An oil drop on the underside of the chip is carefully formed. A camera views the oil drop and determines the contact angle based on the baseline and the center of the oil drop. Examples 4 and 11 also describe the process for measuring contact angles.

The disclosed compositions and methods are used to enhance hydrocarbon recovery from subterranean formations that have been previously been depleted. In some embodiments, the disclosed compositions and methods are used to obtain oil from subterranean formations that are tight rock formations or very tight rock formations. In other embodiments, the subterranean formations are shale formations. In other embodiments, the formation is a tight, or very tight shale formation.

In some embodiments, the composition comprises, consists essentially of, or consists of a colloidal silica modified with glycidyloxypropyltrimethoxy silane nanoparticle, $Al_2(SO_4)_3$ and a surfactant composition comprising, consisting essentially of, or consisting of C10-16-alkyl(2-hydroxy-3-sulfopropyl)dimethyl, ethoxylated castor oil, dimethyl-lauryl-amine, C10-16 alkyl dimethylamines, ethoxylated alcohol, glycol solvents (referred to as composition A). In other embodiments, the composition comprises, consists essentially of, or consists of a colloidal silica modified with glycidyloxypropyltrimethoxy silane nanoparticle, $Al_2(SO_4)_3$ and a surfactant composition comprising, consisting essentially of, or consisting of, cocoamidopropyl hydroxysultaine, glycerol, ethylene glycol, dioctyl sodium sulfosuccinate, ethoxylated hexanol (referred to as composition B). In some embodiments, composition A and composition B increased oil recovery compared to compositions that did not include the disclosed nanoparticles and surfactants. In some embodiments, composition A and composition B reduced the contact angle thereby making the rock more water-wet and increasing oil recovery. In other embodiments, composition A and composition B reduced the interfacial tension force between oil and water thereby increasing oil recovery.

EXAMPLES

The following examples are intended to illustrate different aspects and embodiments of the disclosure and are not to be considered limiting. It will be recognized that various modifications and changes may be made to the experimental embodiments described herein, and without departing from the scope of the claims.

Example 1: Synthesis of Colloidal Silica Modified with Glycidyloxypropyltrimethoxy Silane Aqueous colloidal silica (Nalco 1130G, 30.11% actives, 7-9 nm, 330 $m^2/g$) dispersion was charged to a reactor fitted with a stirrer, condenser and an additional funnel. Deionized (DI) water was added to adjust the final concentration of the silica nanoparticles (SNP) to 10-20% (w/v) and was heated at 60° ° C. Hydrolyzed glycidyloxypropyltrimethoxy silane (GPTMS) solution was added dropwise to the silica dispersion at 60° C. while mixing. The amount of GPTMS added was varied from 0.1 to 20 μmol GPTMS per $m^2$ of the SNP surface. The reaction pH was maintained at 10 and the dispersion was continued to be stirred at 60° ° C. for 24 hours. A small aliquot of the final product was analyzed by NMR to determine associated or bound silane to silica.

Example 2: Synthesis of 3-(dimethyl(3-(trimethoxysilyl) propyl)-ammonio) propane-1-sulfonate (Zwitterion Silane)

To a flask equipped with a stirrer, condenser, and addition funnel, 50 g of acetone and 6.10 g (0.05 mole) of propane sultone were added. 10.37 g (0.05 mole) of (N,N-dimethyl-3-aminopropyl) trimethoxysilane was added dropwise to the solution under $N_2$ atmosphere. The reaction solution was agitated vigorously for 6 hours at room temperature. A white solid that precipitated from solution was filtered and the white solid was washed with acetone and again filtered. The solid was characterized by 1H-NMR and ESI MS.

Example 3: Preparation of Modified Colloidal Silica Using Zwitterion Silane

A commercial colloidal silica of Nalco 41D01 with 20 μm, 150 $m^2/g$ (Nalco/Ecolab) was added to a reactor with an agitator, a condenser, and an addition funnel. The solution of zwitterion silane, as described in Example 2, was added dropwise to the colloidal silica solution under stirring. The amount of zwitterion silane to the silica nanoparticle surface is varied from 0.05 to 50 μmol per $m^2$ of the silica nanoparticle surface. DI water was charged to the reactor and the final concentration of silica nanoparticles was around 20 wt %. The pH remained at approximately 9 and the mixture was increased from room temperature to 70° C. for 24 hours under stirring.

Table 1 lists the surface-modified nanosilica samples that were prepared according to the procedures in Examples 1-3.

TABLE 1

| Sample | Description |
|---|---|
| 8359-88A | 6.5 μmol GPTMS/$m^2$ |
| 8559-09 | 15 μmol GPTMS/$m^2$ |
| 8359-88 AB | 95% 8359-88A + 5% $Al_2(SO_4)_3$ |
| 8559-09B | 95% 8559-09 + 5% $Al_2(SO_4)_3$ |
| 8417-093 | 10 μmol zwitterion silane/$m^2$ |
| 8559-08 | 10 μmol GPTMS/$m^2$ |
| 8559-08B | 95% 8559-08 + 5% $Al_2(SO_4)_3$ |

Example 4: Contact Angle Measurements

The contact angle was measured to determine the effectiveness of the nanosilica samples on improving hydrocarbon recovery from a rock surface.

A clean shale rock was saturated with a crude oil for about 2 weeks to ensure the shale was oil-wet. The crude oil had the following characteristics: API @ 15C=42, saturates=80.40 wt %, aromatics=17.63 wt %, asphaltenes=0.09 wt % and resins=1.88 wt %) The shale rock was then placed inside a glass cuvette containing a brine solution of nanosilica, surfactant (shown in Table 3), or mixture of nanosilica and surfactant. The composition of the brine solution is shown in Table 2. All dosages were based on actives of the products.

TABLE 2

(Brine Composition)

| Chemical Compound | Amount (g/Lit) |
|---|---|
| NaCl | 42.348 |
| KCl | 0.627 |
| CaCl2•2H2O | 5.924 |
| MgCl2•6H2O | 2.399 |
| SrCl2•6H2O | 0.249 |
| NaBr | 0.116 |
| NaHCO3 | 0.296 |
| Na2SO4 | 2.085 |
| DI Water | Make up solution to 1 Liter |

The surfactant was prepared as shown in Table 3.

TABLE 3

(Surfactant)

| Generic Name | Disclosed Name | CAS# | UoM | wt % |
|---|---|---|---|---|
| Inorganic Solvent | Water | 7732-18-5 | % | 44.3 |
| Alkyl Sultaine | Betaines, C10-16-alkyl(2-hydroxy-3-sulfopropyl)dimethyl (Mackam ™ LHS supplied by Solvay) | 72869-77-3 | % | 26.2 |
| Alkylene glycol | Ethylene Glycol | 107-21-1 | % | 19.8 |
| Inorganic salt | Sodium Chloride | 7647-14-5 | % | 4.5 |
| | Dissolvan 3431-1 | 68123-18-2 | % | 1.5 |
| Oxyalkylated Fatty Acid | Ethoxylated Castor Oil | 61791-12-6 | % | 1.0 |
| Fatty alkylamine | Dimethyl-Lauryl-Amine | 112-18-5 | % | 1.0 |

TABLE 3-continued

| (Surfactant) | | | | |
|---|---|---|---|---|
| Generic Name | Disclosed Name | CAS# | UoM | wt % |
| | C10-16 alkyl dimethylamines | 67700-98-5 | % | 0.7 |
| | Alkoxylated ethylenediamine in R-7808 | | % | 0.5 |
| Oxyalkylated alcohol | Ethoxylated Alcohol | 66455-15-0 | % | 0.4 |
| Glycol | Diethylene Glycol | 111-46-6 | % | 0.2 |
| Organic Salt | Tetrasodium EDTA | 64-02-8 | % | 0.05 |
| Carboxylic acid salt | Potassium Acetate | 127-08-2 | % | 0.0033 |
| Ethylene oxide | Ethylene Oxide | 75-21-8 | PPM | 0.04 |

A small drop of the crude oil was carefully placed underneath the rock and the contact angle was measured through the brine phase at room temperature using a camera to observe the droplet based on the baseline and center of the droplet. The contact angle values were measured and reported at equilibrium, namely when the contact angle no longer changed with time. Table 4 lists the contact angle values for the various samples tested.

TABLE 4

| Sample | Contact angle, degrees for oil drop |
|---|---|
| Brine alone | 142 |
| 1000 ppm surfactant | 70 |
| 1000 ppm 8359-88A | 153 |
| 1000 ppm surfactant/ 8359-88A (9/1 ratio) | 50 |
| 250 ppm surfactant | 79 |
| 250 ppm surfactant/ 8359-88A (9/1 ratio) | 64 |
| 1000 ppm 8559-09B | 143 |
| 250 ppm surfactant/ 8559-09B (9/1 ratio) | 47 |
| 1000 ppm 8559-08B | 129 |
| 1000 ppm 8417-093 | 145 |
| 1000 ppm surfactant/ 8417-093 (9/1 ratio) | 47 |
| 250 ppm surfactant/ 8417-093 (9/1 ratio) | 58 |

The lower the contact angle, the more the rock becomes water-wet, and the higher the oil recovery. As Table 4 shows, a lower contact angle was observed for the combination of surface-modified nanosilicas and surfactant.

Example 5: Interfacial Tension (IFT) Measurements

Reducing interfacial tension force between oil and water affects the oil and gas recovery. The lower the IFT values, the better the oil can move into porous media and pass through small pores and pore throats.

Interfacial tension was measured using the Spinning Drop Tensiometer (SDT) by Krüss Scientific, where the video image of an oil drop surrounded by fluid in a rotating capillary was analyzed.

All dosages were based on actives of the products. The oil used is as described in Example 4. Table 5 lists the IFT values for the tested samples.

TABLE 5

| Sample | IFT, dyne/cm |
|---|---|
| Brine alone | 22.25 |
| 1000 ppm 8359-88A | 5.65 |
| 1000 ppm 8559-08B | 9.92 |
| 1000 ppm 8559-09B | 11.08 |
| 1000 ppm 8417-093 | 7.03 |
| 1000 ppm surfactant | 0.47 |
| 250 ppm surfactant | 0.59 |
| 250 ppm surfactant/ 8359-88A (9/1 ratio) | 0.09 |
| 250 ppm surfactant/ 8559-08B (9/1 ratio) | 0.41 |
| 250 ppm surfactant/ 8559-09B (9/1 ratio) | 0.47 |
| 250 ppm surfactant/ 8417-093 (9/1 ratio) | 0.32 |

The results in Table 5 shows mixtures of surfactant and surface-modified nanosilicas have lower interfacial values.

Example 6: Imbibition Test

Core samples of shale were cut and weighed dry. The cut core samples were then placed in a transfer cylinder. A vacuum was placed on the transfer cylinder and after about four hours, oil (API @ 15C=42, saturates=80.40%, aromatics=17.63%, asphaltenes=0.09%, and resins=1.88%) was introduced into the transfer tube via the vacuum to ensure 100% oil saturation. After the sample cores were saturated, they were aged at bottom hole temperatures by placing the transfer cylinder in an oven at a temperature of about 80° C.

The saturated and aged cores were weighed, and the difference in weight between saturated and dry were recorded and divided by the density in grams/mL to obtain the volume of oil in the core plug. The saturated core plug was placed in an imbibition cell with precision graduation of 0.1 mL such that none of the surfaces were in contact with the cell walls or floors. The various solutions tested (as shown in Table 1) were added to the cells such that the test liquid advances up into the neck of the cell with the volume markings. The cell was then placed into an oil bath or an oven at bottom hole temperatures of 80° C. for about 2-6 weeks. The amount of oil that floats to the top of the cell was measured. The amount of additional oil recovered was also measured and plotted. The test continued until oil production stopped.

FIG. 1 shows the oil recovery at 75° C. It can be seen that the composition of both surfactant and surface-modified nanoparticle at 250 ppm were more effective compared to surfactant alone at 1000 ppm.

Example 7: Interfacial Tension Measurements (IFT)

The IFT measurements were conducted as described in Example 5 with the oil as described in Table 7, the brine as described in Table 8, and the samples as described in Table 6.

TABLE 6

| Sample | Description |
|---|---|
| C | 8559-09 (15 μmol GPTMS/$m^2$ as described in Table 1) + 10 wt % $Al_2(SO4)_3$ |
| D | 60.37 wt % water, 21.36 wt % cocoamidopropyl |

TABLE 6-continued

| Sample | Description |
|---|---|
| | hydroxysultaine, 4.30 wt % glycerol, 5.7 wt % ethylene glycol, 4.27 wt % dioctyl sodium sulfosuccinate, 4 wt % ethoxylated hexanol |
| E | surfactant as described in Table 3 |
| F | 100 wt % alkyl hydroxysultaine |

TABLE 7

| Crude Oil Properties | |
|---|---|
| Saturates | 3.77% |
| Aromatics | 74.66% |
| Resins | 9.65% |
| Asphaltenes | 1.96% |
| Base number | 0.2 mg KOH/g |
| Acid number | 0.19 mg KOH/g |

TABLE 8

| Brine Composition | |
|---|---|
| | mg/L |
| Cations | |
| Barium (Ba) | 0.114 |
| Calcium (Ca) | 4288 |
| Iron (Fe) | 9.841 |
| Magnesium (Mg) | 939 |
| Sodium (Na) | 33590.24 |
| Strontium (Sr) | 174.9 |
| Anions | |
| Chloride (Cl) | 61244 |
| Sulfate (SO4) | 1295 |
| Alkalinity | |
| Bicarbonate | 244 |
| pH | 7 |
| Total dissolved solids | 101785.2 |
| Specific Gravity | 1.037 |

TABLE 9

| IFT values | |
|---|---|
| Samples | IFT (mN/m) |
| DI water | 19.76 |
| Brine | 15.045 |
| 1000 ppm sample E | 2.235 |
| 1000 ppm sample D | 0.104 |
| 500 ppm sample C | 18.857 |
| 250 ppm sample E/ 250 ppm sample C | 1.778 |
| 250 ppm sample D/ 250 ppm sample C | 0.0110 |

The results in Table 9 showed mixtures or blends of surfactant and surface-modified nanosilica have lower interfacial values.

Example 8: Interfacial Tension Measurements (IFT)

The IFT was conducted as described in Example 5 with crude oil from the Permian basin (Table 9) and the brine composition (Table 10).

TABLE 10

| Crude Oil Properties | |
|---|---|
| Saturates | 80.4% |
| Aromatics | 17.63% |
| Resins | 1.88% |
| Asphaltenes | 0.09% |
| Base number | 0.3 mgKOH/g |
| Acid number | 0.1 mgKOH/g |

TABLE 11

| Brine composition | |
|---|---|
| Components | g/L |
| NaCl | 108.75 |
| $Na_2SO_4$ | 3.006 |
| $CaCl_2 \cdot 2H_2O$ | 10.983 |
| $MgCl_2 \cdot 6H_2O$ | 4.984 |
| DI water | Make up solution to 1 liter |

TABLE 12

| Samples | IFT (dyne/cm) |
|---|---|
| Untreated | 22.07 |
| 1000 ppm sample C | 20.02 |
| 1000 ppm sample D | 0.08 |
| 500 ppm sample D + 500 ppm sample C | 0.02 |
| 900 ppm sample D + 100 ppm sample C | 0.07 |
| 700 ppm sample D + 300 ppm sample C | 0.06 |

The results in Table 12 blends of the functionalized nanosilica with surfactants lowered the IFT more than the individual components.

Example 9: Imbibition Test

The imbibition test was conducted as described in Example 6. Table 13 lists the oil recovery in a tertiary mode for various samples as described in Table 6, using fluids in Tables 7 and 8 at 61.7° C. (143° F.).

TABLE 13

| Imbibition results | |
|---|---|
| Sample | % oil recovery after 400 hours |
| Untreated | 0 |
| 250 ppm sample C + 250 ppm sample D | 21.35 |
| 1000 ppm sample D | 12.71 |
| 250 ppm sample C + 250 ppm sample E | 8.82 |
| 1000 ppm sample E | 15.06 |

The composition with both surfactant and surface-modified nanoparticle were more effective compared to surfactant alone at 1000 ppm.

Example 10: Contact Angle Measurements

The contact angle was determined as described in Example 4. Shale rock was polished using a diamond plate to ensure a smooth surface. Smoothed-surface shale rock was then vacuum-saturated with crude oil (Table 7) and then aged at 61.7° C. (143° F.) for 2 weeks. The aged shale rock was then soaked in a solution of brine (Table 8) with or without surfactants for three days. Finally, the contact angle measurements were performed in a Ramé-Hart Goniometer instrument using the captive bubble method: The droplet of oil was injected underneath the surface of the chip. The contact angle was then measured and analyzed using DROPImage software. The lower the contact angle, the more water-wet state the rock becomes. This in turn would cause the oil to release from the rock more easily.

TABLE 14

| Sample | Contact angle (degrees) |
|---|---|
| Brine alone | 154 |
| 250 ppm sample D | 135 |
| 250 ppm sample E | 108 |
| 250 ppm sample C | 151 |
| 250 ppm sample C + 250 ppm sample D | 94 |
| 250 ppm sample C + 250 ppm sample E | 83 |

It can be seen that blends of the functionalized nanosilica and surfactants lowered the contact angles.

What is claimed is:

1. A method of enhanced hydrocarbon recovery from a subterranean formation, the method comprising:

introducing a treatment fluid into a subterranean formation or well, wherein the treatment fluid comprises:

(a) surface-modified silica nanoparticles having a surface modified with an alkoxysilane, (b) a stability component, the stability component comprising a sulfate, a chloride, a carbonate, or an oxide salt of aluminum, titanium, or zirconium, wherein the stability component is present in a range of from 0.1 wt % to 10 wt % based on total weight of the treatment fluid, (c) a surfactant composition comprising i) a sulfobetaine, ii) a nonionic surfactant comprising an ethoxylated alcohol, and iii) an anionic surfactant, and (d) a solvent, wherein the sulfobetaine is present in a range of from 10 wt % to 20 wt %, the ethoxylated alcohol is present in a range of from 2 wt % to 4 wt %, and the anionic surfactant is present in a range of from 2 wt % to 4 wt % based on a total weight of the treatment fluid.

2. The method of claim 1, further comprising:

recovering a hydrocarbon from the subterranean formation or well.

3. The method of claim 1, wherein the alkoxysilane comprises 3-glycidoxypropyltrimethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl) propyltrimethoxysilane, 2-(3,4-epoxycyclohexyl) propyltriethoxysilane, 2-(3,4-epoxycyclohexyl) ethyltrimethoxysilane, 2-(3,4-epoxycyclohexyl) ethyltriethoxysilane, 2-(3,4-epoxycyclohexyl) methyltrimethoxysilane, 2-(3,4-epoxycyclohexyl) methyltriethoxysilane, [(3-ethyl-3-oxethanyl)methoxy]propyltrimethoxysilane, [(3-ethyl-3-oxethanyl)methoxy]propyltriethoxysilane, or a combination thereof.

4. The method of claim 1, wherein the surface-modified silica nanoparticles comprise a core and a shell, wherein the core comprises a material other than silica and the shell comprises silica.

5. The method of claim 1, wherein a ratio of the alkoxysilane to silica nanoparticles in the surface-modified silica nanoparticles is in a range of from 0.01:15 to 0.1:5.

6. The method of claim 1, wherein a weight ratio of the surface-modified silica nanoparticles to the surfactant composition is 1:1 to 1:20.

7. The method of claim 1, wherein the sulfobetaine comprises one or more of 3-((C10-C16)-alkyldimethylammonio)-2-hydroxypropanesulfonate, C10-16-alkyl(2-hydroxy-3-sulfopropyl)dimethyl betaine, and cocoamidopropyl hydroxysultaine.

8. The method of claim 1, wherein the nonionic surfactant further comprises one or more of ethoxylated castor oil, dimethyl-lauryl-amine, C10-16 alkyl dimethylamines, and alkoxylated ethylenediamine.

9. The method of claim 1, wherein the anionic surfactant comprises a sulfosuccinate.

10. The method of claim 1, wherein the stability component is aluminum sulfate.

11. The method of claim 1, wherein the solvent comprises a water source and a coupling agent.

12. The method of claim 11, wherein the water source has from 0 wt % to 35 wt % total dissolved solids, a temperature in a range of from 60° C. to 250° C., or both; wherein the coupling agent comprises glycerol.

13. The method of claim 1, wherein the subterranean formation or well comprises a low permeability formation having a permeability in a range of from 0.01 mD to 0.1 mD.

14. The method of claim 1, wherein the treatment fluid contacts a solid surface of the subterranean formation or well, and a contact angle of water on the solid surface is altered by at least 10°.

15. The method of claim 1, wherein the treatment fluid contacts a subterranean formation and changes the subterranean formation from oil wettable to water wettable.

16. The method of claim 1, wherein the subterranean formation or well comprises a shale formation, a secondary well, or a tertiary well.

17. A treatment fluid for enhanced hydrocarbon recovery comprising:

surface-modified silica nanoparticles having a surface modified with an alkoxysilane;

a stability component, the stability component comprising a sulfate, a chloride, a carbonate, or an oxide salt of aluminum, titanium, or zirconium, wherein the stability component is present in a range of from 0.1 wt % to 10 wt % based on total weight of the treatment fluid;

a surfactant composition comprising i) a sulfobetaine, ii) a nonionic surfactant comprising an ethoxylated alcohol, and iii) an anionic surfactant; and a solvent, wherein the sulfobetaine is present in a range of from 10 wt % to 20 wt %, the ethoxylated alcohol is present in a range of from 2 wt % to 4 wt %, and the anionic surfactant is present in a range of from 2 wt % to 4 wt % based on a total weight of the treatment fluid.

18. The treatment fluid of claim 17, wherein the alkoxysilane comprises 3-glycidoxypropyltrimethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl) propyltrimethoxysilane, 2-(3,4-epoxycyclohexyl) propyltriethoxysilane, 2-(3,4-epoxycyclohexyl) ethyltrimethoxysilane, 2-(3,4-epoxycyclohexyl) ethyltriethoxysilane, 2-(3,4-epoxycyclohexyl) methyltrimethoxysilane, 2-(3,4-epoxycyclohexyl) methyltriethoxysilane, [(3-ethyl-3-oxethanyl)methoxy]propyltrimethoxysilane, [(3-ethyl-3-oxethanyl)methoxy]propyltriethoxysilane, or a combination thereof.

19. The treatment fluid of claim 17, wherein the sulfobetaine comprises 3-((C10-C16)-alkyldimethylammonio)-2-hydroxypropanesulfonate, C10-16-alkyl(2-hydroxy-3-sulfopropyl)dimethyl betaine, cocoamidopropyl hydroxysultaine, or combinations thereof; and wherein the nonionic surfactant further comprises ethoxylated castor oil, dimethyl-lauryl-amine, C10-16 alkyl dimethylamines, alkoxylated ethylenediamine, or combinations thereof.

20. The treatment fluid of claim 17, wherein the stability component is aluminum sulfate, and wherein the solvent comprises a water source and a coupling agent.

21. The treatment fluid of claim 17, wherein a weight ratio of the surface-modified silica nanoparticles to the surfactant composition is 1:1 to 1:20, wherein a ratio of the alkoxysilane to silica nanoparticles in the surface-modified silica nanoparticles is in a range of from 0.01:15 to 0.01:5.

22. The treatment fluid of claim 17, wherein the anionic surfactant comprises a sulfosuccinate.

* * * * *